(12) United States Patent
Hur et al.

(10) Patent No.: US 7,583,595 B2
(45) Date of Patent: Sep. 1, 2009

(54) DATA SLOT ALLOCATION METHOD IN DISTRIBUTED WIRELESS PERSONAL AREA NETWORKS

(75) Inventors: Kyeong Hur, Seoul (KR); Yong-suk Kim, Daejeon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 603 days.

(21) Appl. No.: 11/345,506

(22) Filed: Feb. 2, 2006

(65) Prior Publication Data
US 2006/0250958 A1    Nov. 9, 2006

(30) Foreign Application Priority Data
Mar. 31, 2005    (KR) ............ 10-2005-0027098

(51) Int. Cl.
*H04J 3/14* (2006.01)
(52) U.S. Cl. ............ 370/230; 370/329; 370/395.21; 370/468
(58) Field of Classification Search ............ 370/229, 370/230, 310, 328, 329, 336, 395.1, 468; 709/223, 226
See application file for complete search history.

(56) References Cited

U.S. PATENT DOCUMENTS

| | | | |
|---|---|---|---|
| 6,072,787 A | 6/2000 | Hamalainen et al. | |
| 6,570,860 B2 * | 5/2003 | Hamalainen et al. | 370/329 |
| 6,788,702 B1 | 9/2004 | Garcia-Luna-Aceves et al. | |
| 7,324,523 B2 * | 1/2008 | Dacosta | 370/395.41 |
| 7,406,098 B2 * | 7/2008 | Taneja et al. | 370/468 |
| 2004/0156312 A1 | 8/2004 | Salonidis et al. | |
| 2004/0158644 A1 | 8/2004 | Albuquerque et al. | |
| 2005/0213503 A1 * | 9/2005 | Guo et al. | 370/230 |

FOREIGN PATENT DOCUMENTS

| | | |
|---|---|---|
| EP | 1 648 121 A2 | 4/2006 |
| JP | 2000-115198 A | 4/2000 |
| JP | 2003-101551 A | 4/2003 |
| KR | 2003-0040818 A | 5/2003 |
| WO | 2004/114596 A1 | 12/2004 |

OTHER PUBLICATIONS

A.S. Tanenbaum: "Computer Networks", pp. 460-462, Prentice-Hall International, ISBN 0-13-349945-6, London, 1996.
Hiertz et al: "A new MAC Protocol for a wireless multi-hop broadband system beyond IEEE 802.11", pp. 1-6, Wireless World Research Forum, Zurich, Jul. 2003.

* cited by examiner

*Primary Examiner*—Chi H Pham
*Assistant Examiner*—Weibin Huang
(74) *Attorney, Agent, or Firm*—Sughrue Mion, PLLC

(57) ABSTRACT

A data slot allocation method for a stream delivery in an ultra wide band (UWB) wireless personal area network (WPAN) based on an ad-hoc network of a distributed network topology. The number of data slots allocable to each stream, including a new stream, to be transferred is calculated. The necessary data slots are relinquished to the new stream from existing streams when the number of the allocable data slots is less than a number of preset data slots of the new stream.

7 Claims, 3 Drawing Sheets

| STREAM INDEX | REQUIRED DR | DESIRED DR | $SoQ_F$ |
|---|---|---|---|

| STREAM INDEX | REQUIRED DR | DESIRED DR | SoQ$_F$ |

| STREAM INDEX | REQUIRED DR | DESIRED DR | SERVICE CLASS | SoQ$_{min-class}$ | SoQ$_{F-class}$ |

DATA SLOT ALLOCATION METHOD IN DISTRIBUTED WIRELESS PERSONAL AREA NETWORKS

CROSS-REFERENCE TO RELATED APPLICATIONS

This application claims priority from Korean Patent Application No. 10-2005-0027098 filed on Mar. 31, 2005, in the Korean Intellectual Property Office, the entire disclosure of which is incorporated herein by reference.

BACKGROUND OF THE INVENTION

1. Field of the Invention

Methods consistent with the present invention relate to a channel time allocation method in a distributed wireless personal area network which is based on a mobile ad-hoc network, for data slot allocation of media access control (MAC).

2. Description of the Related Art

A wireless personal area network (WPAN) operates in a personal area within about 1 0m. The Institute of Electrical and Electronics Engineers (IEEE) is working on the standardization of the WPAN. Ultra wide band (UWB) technology can provide a data rate more than hundreds of Mbps in the WPAN. In the WPAN, all devices share a communication medium. This requires a MAC to control the media access of the devices. The MAC in a broad sense includes how to access the network, how to transfer data to another device at a desired data rate, and how to optimally use the media.

The MAC for the WPAN can be designed in either the centralized approach or the distributed approach. In the centralized approach, each device operates for the entire network so as to manage and control the media access of all of the devices. The devices require a centralized coordinator for the sake of the media access such as channel time allocation. In the distributed approach, the media access is uniformly distributed to all of the devices in the network. The devices share the burden of managing their media access.

FIG. 1 depicts a conventional WPAN. In FIG. 1, the network supports the centralized MAC approach based on IEEE 802.15.3, and includes a piconet. One device in the piconet is a piconet coordinator (PNC) 10. The PNC 10 provides functions to admit the network access of a device, to allocate a channel (time slot) to transfer data to another device, and to synchronize the devices. This is the centralized ad-hoc WPAN.

FIG. 2 depicts a WPAN without a centralized coordinator. Referring to FIG. 2, the WPAN includes a plurality of devices indicated as dots. Circles around the devices represent a communication range of the relevant devices.

The network in FIG. 2 supports the distributed MAC approach. All of the devices collaborate and share required information for the MAC such as the approval of the joining of a new device, the channel time allocation to each device to transfer data to another device, the synchronization, and the power reduction. Accordingly, none of the devices in the network is the dedicated coordinator.

The distributed MAC approach depends on a timing called a superframe. The superframe has a fixed length of time and is split into a plurality of time windows called time slots. The time slot is also called a medium access slot (MAS). Most of the time slots are used to send a beacon by the devices. The rest of the time slots are used to transfer data. The slots for the beacon transmission are beacon slots, and the slots for the data transfer are data slots. The length of a beacon period (BP) may be less than that of a data period. The beacon slots are distributed over the slots of the superframe or put in front of the superframe. The number of beacons may be fixed, or variable when it is implemented according to other distributed MAC approaches.

FIG. 3 depicts a conventional superframe format. The superframe format, as shown in FIG. 3, is based on the multi-band orthogonal frequency division modulation (OFDM) Alliance draft v0.5. The superframe consists of 256 MAS's. Reference numeral a10 indicates the beacon period comprising the beacon slots, and reference numeral a20 indicates the data period comprising MAS's usable by other devices to transfer a stream (data) to the other devices in the network. The length of the superframe is 64 ms and the length of each MAS is 256 μs.

Information relating to the superframe is broadcast in the beacon slots forming the beacon period assigned to each device. Neighbor devices utilize the broadcast information in the next superframe. The start point of the superframe is determined by the start of the beacon period, and is defined to a beacon period start time (BPST).

The devices need to search for free beacon slots that are unused in the beacon period so as to send their beacons. Furthermore, the free data slots are required for mutual communication of the devices. However, in the situation that free data slots are absent, the devices cannot transmit and receive the stream when needed. As a result, new methods are required to seamlessly transmit and receive the stream even when a free data slot is not available.

SUMMARY OF THE INVENTION

An aspect of the present invention is to provide a method for efficient allocation of data slots to at least two devices that need to transmit a stream and utilize action of the allocated data slots in a UWB WPAN based on an ad-hoc network of a distributed network topology.

A data slot allocation method for a stream delivery in a distributed WPAN including at least two devices that transfer streams using at least one data slot, includes calculating a number of data slots allocable to each stream, including a new stream, to be transferred; and relinquishing the data slots allocated to the new stream when the number of the allocable data slots is less than a number of preset data slots.

BRIEF DESCRIPTION OF THE DRAWINGS

These and other aspects of the invention will become apparent and more readily appreciated from the following description of exemplary embodiments, taken in conjunction with the accompanying drawings of which.

DETAILED DESCRIPTION OF THE EXEMPLARY EMBODIMENTS

Figure 1:
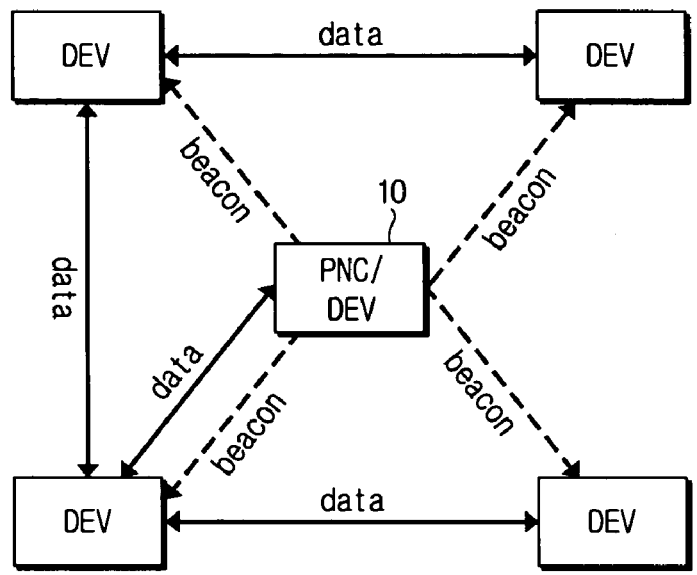
FIG. 1 illustrates a conventional WPAN.
Figure 2:
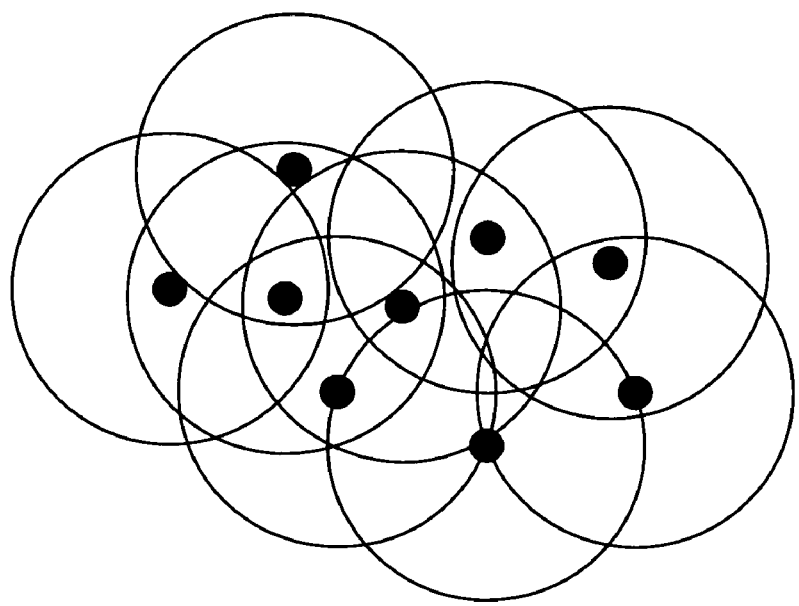
FIG. 2 illustrates a conventional WPAN without a centralized coordinator.
Figure 3:
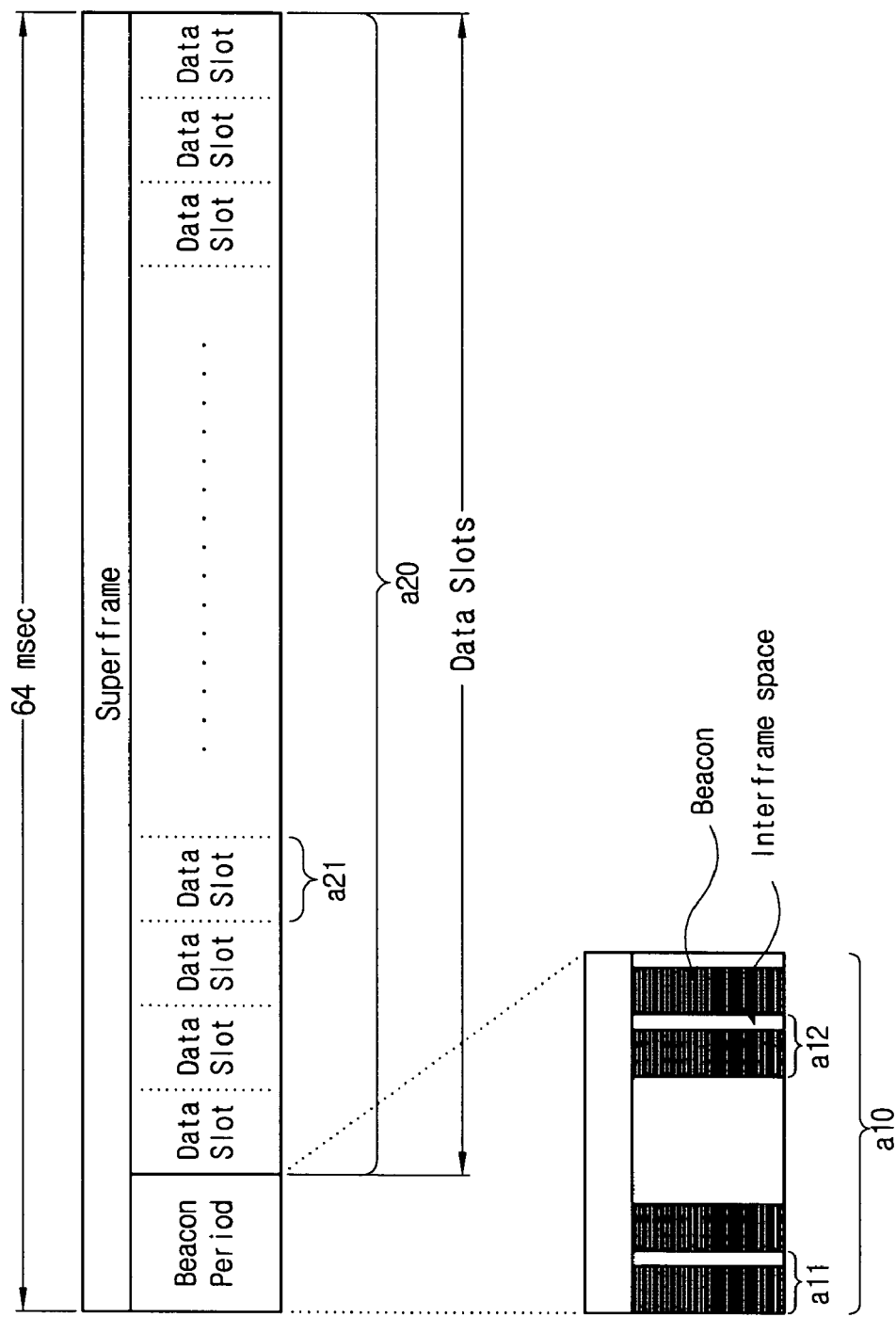
FIG. 3 illustrates a conventional superframe format.

Certain exemplary embodiments of the present invention will now be described in greater detail with reference to the accompanying drawings.

In the following description, same drawing reference numerals are used for the same elements even in different drawings. The matters defined in the description, such as a detailed construction and element descriptions, are provided to assist in a comprehensive understanding of the invention. Also, well-known functions or constructions are not described in detail since they would obscure the invention in unnecessary detail.

Prior to descriptions of the present invention, definitions defined in the embodiment of the present invention are explained.

The variable K represents the number of streams registered in a beacon period. Specifically, the variable K represents the number of streams transmitted in one superframe. The number of streams is recognized by a beacon slot included in the beacon period. The variable j represents a j-th stream of K streams.

The variable BW represents the number of data slots in a superframe. That is, the variable BW represents a length of a period capable of actually carrying data. The variable n represents a n-th superframe. Use of data slots in a (n+1)-th superframe takes advantage of information of beacon slots in the n-th superframe.

The variable $S_{j,n}$ represents a data rate (DR) or the number of data slots (MAS's) supported in the j-th stream of the n-th superframe. The variable $R_j$ represents a required data rate or a required number of data slots by the j-th stream. The variable $D_j$ represents a desired data rate or a desired number of data slots by the j-th stream.

The variable $SoQ_{j,n}$ represents a QoS at the j-th stream in the n-th superframe. The variable $SoQ_{j,n}$ is calculated from Equation 1

$$SoQ_{j,n} = \frac{S_{j,n} - R_j}{D_j - R_j} \qquad \text{[Equation 1]}$$

The variable $Re_j$ represents a data rate or the number of data slots relinquished from the j-th stream.

An exemplary embodiment of the present invention now will be elucidated in reference to the attached drawings. According to an exemplary embodiment of the present invention, each device calculates $SoQ_F$, the satisfaction of a QoS. The variable $SoQ_F$ can be also calculated from Equation 1.

Figures 4, 5, 6:
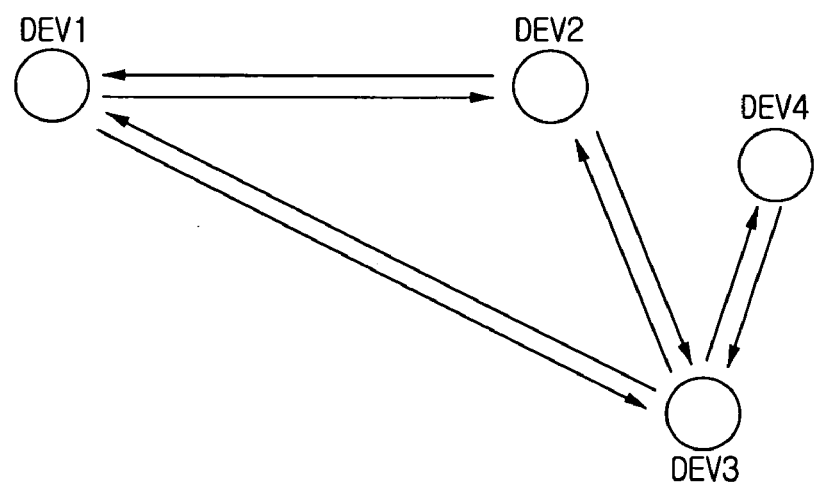
FIG. 4 illustrates fields of a Quality of Service (QoS) information element (IE) of a distributed WPAN according to an exemplary embodiment of the present invention.
FIG. 5 illustrates streams transmitted and received between devices forming the distributed WPAN according to an exemplary embodiment of the present invention.
FIG. 6 illustrates fields of the QoS IE of the distributed WPAN according to another exemplary embodiment of the present invention

FIG. 4 depicts fields of a QoS IE according to an exemplary embodiment of the present invention. The QoS IE is carried over a common control channel. Referring to FIG. 4, the QoS IE includes a stream index, a required DR, a desired DR, and a $SoQ_F$.

FIG. 5 depicts the data transfer of each device in an ad-hoc network that includes devices DEV1 through DEV4 according to an exemplary embodiment of the present invention. As shown in FIG. 5, the DEV1 transmits and receives to and from the DEV2. The DEV2 transmits and receives to and from the DEV3. The DEV3 transmits and receives to and from the DEV4.

Table 1 shows the DR (the time slot) allocated to the DEV1 through the DEV4 of the ad-hoc network that supports the DR of 360 Mbps by 210 MAS's.

TABLE 1

| Stream index | Required DR | Desired DR | Allocated DR | SoQ_F |
|---|---|---|---|---|
| A(DEV1→DEV2) | 40 Mbps | 60 Mbps | 60 Mbps | 1 |
| B(DEV2→DEV1) | 40 Mbps | 60 Mbps | 60 Mbps | 1 |
| C(DEV3→DEV4) | 40 Mbps | 60 Mbps | 60 Mbps | 1 |
| D(DEV4→DEV3) | 40 Mbps | 60 Mbps | 60 Mbps | 1 |

TABLE 1-continued

| Stream index | Required DR | Desired DR | Allocated DR | SoQ_F |
|---|---|---|---|---|
| E(DEV3→DEV1) | 40 Mbps | 60 Mbps | 60 Mbps | 1 |
| F(DEV1→DEV3) | 40 Mbps | 60 Mbps | 60 Mbps | 1 |

In Table 1, there are six streams, and each stream is allocated the DR of 60 Mbps. Thus, $SoQ_F$ is 1 based on Equation 1.

It is assumed that a stream G is carried from the DEV3 to the DEV2 when the stream A through the stream F are transmitted and received as shown in FIG. 5. To transmit the stream G to the DEV2, the DEV3 needs a part of the data slots allocated to the stream A through the stream F. Table 2 shows the reallocation of the part of data slots allocated to transfer the stream A through the stream G.

TABLE 2

| Stream index | Required DR | Desired DR | Reallocated DR | SoQ_F |
|---|---|---|---|---|
| A(DEV1→DEV2) | 40 Mbps | 60 Mbps | 51.428 Mbps | 0.571 |
| B(DEV2→DEV1) | 40 Mbps | 60 Mbps | 51.428 Mbps | 0.571 |
| C(DEV3→DEV4) | 40 Mbps | 60 Mbps | 51.428 Mbps | 0.571 |
| D(DEV4→DEV3) | 40 Mbps | 60 Mbps | 51.428 Mbps | 0.571 |
| E(DEV3→DEV1) | 40 Mbps | 60 Mbps | 51.428 Mbps | 0.571 |
| F(DEV1→DEV3) | 40 Mbps | 60 Mbps | 51.428 Mbps | 0.571 |
| G(DEV3→DEV2) | 40 Mbps | 60 Mbps | 51.428 Mbps | 0.571 |

Principally, the same DR is allocated to the respective streams. In the case that it is infeasible to allocate the same DR, a higher DR is allocated to the existing streams than a new stream.

In Table 2, even when the DEV3 is allocated the part of the data slots that are assigned for the delivery of the stream A through the stream F in order to transfer the stream G to the DEV2, the DR serviced to the stream A through the stream F is greater than the required DR. Thus, the streams A through F are transferred at the reallocated DR.

By contrast, when the reallocated DR is less than the required DR, the streams A through F do not relinquish the part of their allocated data slots for the sake of the stream G. That is, when $SoQ_F$ is less than zero, the streams A through F do not relinquish the part of their allocated data slots to transfer the stream G.

The variable $SoQ_F$, which is adjusted when the part of the data slots is allocated for the stream G, is calculated based on Equation 2.

$$SoQ_{F,n+1} = \frac{BW - \sum_{j=1}^{K} R_j}{\sum_{j=1}^{K} (D_j - R_j)} \qquad \text{[Equation 2]}$$

In Equation 2 and Table 2, the variable BW is 360 Mbps, the variable K is 7, the variable $D_j$ is 60 Mbps, and the variable $R_j$ is 40 Mbps. Hence the adjusted $SoQ_F$ is 0.571 as in Table 2.

Hereafter, explanations are provided according another exemplary embodiment of the present invention. In another exemplary embodiment of the present invention, the DR allocated to the stream varies depending on the service class.

FIG. 6 depicts fields that form a QoS IE according to another exemplary embodiment of the present invention.

Referring to FIG. 6, the QoS IE includes a stream index, a required DR, a desired DR, a service Class, $SoQ_{min\_class}$, and $SoQ_{F\_class}$. The variable $SoQ_{min\_class}$ represents satisfaction of a required QoS to be guaranteed at the stream of the relevant service class. Streams at the same service class have the same $SoQ_{min\_class}$. The variable $SoQ_{F\_class}$ represents the satisfaction of the QoS which is assigned to the relevant stream.

Another exemplary embodiment of the present invention is now explained with reference to FIG. 5. Table 3 shows the DR's assigned to the streams at the different service classes according to another exemplary embodiment of the present invention. In further detail, Table 3 shows the DR's allocated to the DEV1 through the DEV4 that form the ad-hoc network supporting the data rate of 360 Mbps by 210 MAS's.

TABLE 3

| Stream Index | Required DR | Desired DR | Allocated DR | Service class | $SoQ_{min\_class}$ | $SoQ_{F\_class}$ |
|---|---|---|---|---|---|---|
| A(DEV1→DEV2) | 40 Mbps | 60 Mbps | 60 Mbps | Class 1 | 0.8 | 1.0 |
| B(DEV2→DEV1) | 40 Mbps | 60 Mbps | 60 Mbps | Class 1 | 0.8 | 1.0 |
| C(DEV3→DEV4) | 40 Mbps | 60 Mbps | 60 Mbps | Class 2 | 0.6 | 1.0 |
| D(DEV4→DEV3) | 40 Mbps | 60 Mbps | 60 Mbps | Class 2 | 0.6 | 1.0 |
| E(DEV3→DEV1) | 40 Mbps | 60 Mbps | 60 Mbps | Class 3 | 0.4 | 1.0 |
| F(DEV1→DEV3) | 40 Mbps | 60 Mbps | 60 Mbps | Class 3 | 0.4 | 1.0 |

In Table 3, the number of streams is six, and each stream is allocated the data rate of 60 Mbps. Accordingly, $SoQ_{F\_class}$ is 1 based on Equation 2.

As shown in FIG. 5, it is assumed that the stream G is carried from the DEV3 to the DEV2 when the stream A through the stream F are transmitted and received. To transmit the stream G to the DEV2, the DEV3 needs a part of the data slots allocated to transfer the stream A through the stream F. Table 4 shows the reallocation of the part of data slots allocated to transfer the stream A through the stream G.

TABLE 4

| Stream index | Required DR | Desired DR | Reallocated DR | Service class | $SoQ_{min\_class}$ | $SoQ_{F\_class}$ |
|---|---|---|---|---|---|---|
| A(DEV1→DEV2) | 40 Mbps | 60 Mbps | 55.14 Mbps | Class 1 | 0.7 | 0.757 |
| B(DEV2→DEV1) | 40 Mbps | 60 Mbps | 55.14 Mbps | Class 1 | 0.7 | 0.757 |
| C(DEV3→DEV4) | 40 Mbps | 60 Mbps | 51.90 Mbps | Class 2 | 0.5 | 0.595 |
| D(DEV4→DEV3) | 40 Mbps | 60 Mbps | 51.90 Mbps | Class 2 | 0.5 | 0.595 |
| E(DEV3→DEV1) | 40 Mbps | 60 Mbps | 48.64 Mbps | Class 3 | 0.3 | 0.432 |
| F(DEV1→DEV3) | 40 Mbps | 60 Mbps | 48.64 Mbps | Class 3 | 0.3 | 0.432 |
| G(DEV3→DEV2) | 40 Mbps | 60 Mbps | 48.64 Mbps | Class 3 | 0.3 | 0.432 |

Principally, the same DR is allocated to the streams at the same service class. In case that it is infeasible to allocate the same DR, a higher DR is allocated to the existing streams than a new stream.

When the reallocated DR is less than $SoQ_{min\_class}$, the stream A through the stream F do not relinquish a part of their allocated data slots for the sake of the stream G. That is, when $SoQ_{F\_class}$ is less than $SoQ_{min\_class}$, the stream A through the stream F do not relinquish the part of their allocated data slots to transfer the stream G.

As set forth above, when data slots are allocated to transfer the streams in the distributed WPAN, different data rates are supported according to the service class to thus efficiently deliver the streams. Furthermore, when a higher data rate is serviced than the required data rate, the unnecessary data rate is used to transfer another stream. As a result, the streams can be delivered efficiently.

While the present invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A data slot allocation method for a stream delivery in a distributed wireless personal area network (WPAN) including at least two devices that transfer streams using at least one data slot, the method comprising:
   the at least two devices:
   calculating a number of data slots allocable to each stream, including a new stream, to be transferred; and
   relinquishing the data slot allocated to the new stream when the number of the allocable data slots is less than a number of preset data slots,
   wherein the devices generate information comprising a number of required data slots, a number of desired data slots, and a satisfaction of quality of service (QoS), and transmit the generated information, and
   wherein the satisfaction of QoS is calculated from the equation:

$$SoQ = \frac{S - R}{D - R}$$

where SoQ denotes a satisfaction of QoS, D denotes a number of desired data slots, R denotes a number of required data slots, and S denotes a number of allocated data slots.

2. The data slot allocation method of claim 1, wherein the number of the preset data slots is the same as the number of the required data slots.

3. The data slot allocation method of claim 1, wherein each stream comprises one of at least two service classes, and the number of the preset data slots which varies according to the service class.

4. The data slot allocation method of claim 3, wherein the devices generate information comprising a number of required data slots to transfer the streams, a number of desired data slots, a service class, a number of required data slots to maintain the service class, and a satisfaction of QoS, and transmit the generated information.

5. The data slot allocation method of claim 4, wherein the number of the preset data slots is the same as the number of the required data slots to maintain the service class.

6. The data slot allocation method of claim 4, wherein the information is transmitted via a common control channel.

7. The data slot allocation method of claim 3, wherein a device which needs to transfer a stream requests the data slot allocation to neighbor devices.

* * * * *